United States Patent
Tanaka et al.

(10) Patent No.: US 10,921,181 B2
(45) Date of Patent: Feb. 16, 2021

(54) PHOTOELECTRIC SENSOR

(71) Applicant: OMRON Corporation, Kyoto (JP)

(72) Inventors: Motoki Tanaka, Kyoto (JP); Takahiro Okuda, Kyoto (JP); Jumpei Nakamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 5 days.

(21) Appl. No.: 16/248,805

(22) Filed: Jan. 16, 2019

(65) Prior Publication Data

US 2019/0285466 A1  Sep. 19, 2019

(30) Foreign Application Priority Data

Mar. 14, 2018 (JP) .............. JP2018-046492

(51) Int. Cl.
*G01J 1/04* (2006.01)
*G01V 8/12* (2006.01)
*G01S 7/481* (2006.01)
*G01S 17/04* (2020.01)

(52) U.S. Cl.
CPC .......... *G01J 1/0407* (2013.01); *G01S 7/4813* (2013.01); *G01S 17/04* (2020.01); *G01V 8/12* (2013.01)

(58) Field of Classification Search
CPC ...... G01J 1/0407; G01S 17/04; G01S 7/4813; G01V 8/12; G01V 8/14
See application file for complete search history.

(56) References Cited

U.S. PATENT DOCUMENTS

| 2013/0181131 | A1 | 7/2013 | Holenarsipur |
| 2015/0115139 | A1* | 4/2015 | Okushiba ............. G01S 7/4813 250/216 |
| 2017/0294426 | A1 | 10/2017 | Uchida |

FOREIGN PATENT DOCUMENTS

| CN | 102105817 | 6/2011 |
| CN | 103620799 | 3/2014 |
| CN | 106663716 | 5/2017 |
| EP | 2701209 | 2/2014 |
| JP | S56-007242 | 1/1981 |
| JP | 2013239578 | 11/2013 |

(Continued)

OTHER PUBLICATIONS

"Search Report of Europe Counterpart Application", dated Aug. 1, 2019, pp. 1-6.

(Continued)

*Primary Examiner* — Tony Ko
(74) *Attorney, Agent, or Firm* — JCIPRNET

(57) ABSTRACT

A light guide member includes: a light projecting side light guide part that extends in the front-and-rear direction and guides light emitted from a light projecting part to the outside of a case; a light receiving side light guide part that extends in the front-and-rear direction and is spaced apart from the light projecting side light guide part by a gap in the up-and-down direction, and guides light that enters from the outside of the case to a light receiving part; and a connecting part disposed over the gap and connecting the light projecting side light guide part and the light receiving side light guide part. The gap is provided with a reduction part at an end portion on the side of the connecting part, and a dimension of the reduction part gradually decreases toward the side of the light projecting part.

3 Claims, 11 Drawing Sheets

(56) References Cited

FOREIGN PATENT DOCUMENTS

WO    2016047545    3/2016

OTHER PUBLICATIONS

"Office Action of China Counterpart Application", dated Jul. 21, 2020, with English translation thereof, p. 1-p. 11.
"Office Action of Japan Counterpart Application" with English translation thereof, dated Nov. 30, 2020, p. 1-p. 7.

* cited by examiner

PHOTOELECTRIC SENSOR

CROSS-REFERENCE TO RELATED APPLICATION

This application claims the priority benefit of Japanese application serial no. 2018-046492, filed on Mar. 14, 2018. The entirety of the above-mentioned patent application is hereby incorporated by reference herein and made a part of this specification.

BACKGROUND

Technical Field

The disclosure relates to a photoelectric sensor.

Description of Related Art

A photoelectric sensor has been used as a device for detecting whether an object is present in the detection region, the surface condition of the object, etc. In the photoelectric sensor disclosed in Patent Document 1, a light projecting part for emitting light and a light receiving part for receiving light are housed inside a case. Two light guide paths are formed inside the case, and the light emitted by the light projecting part is emitted to the outside of the case through one light guide path. The light that enters from the outside of the case reaches the light receiving part through the other light guide path.

A photoelectric sensor, which has a light guide member disposed in each light guide path, is also known. The light guide member guides the light that enters inside while reflecting it at the boundary surface. By using such a light guide member, it is possible to increase the amount of light emitted to the outside of the case and the amount of light reaching the light receiving part from the outside of the case, and improve the detection accuracy of the object.

A photoelectric sensor, which guides light in two light guide paths by a single light guide member for reducing the number of parts used for the photoelectric sensor, is also known. However, for such a photoelectric sensor, the shape of the light guide member may become complicated, and light may be reflected unexpectedly inside the light guide member and the reflected light may reach the light receiving part, resulting in erroneous detection.

RELATED ART

Patent Document

[Patent Document 1] Japanese Laid-Open No. 2013-239578

SUMMARY

A photoelectric sensor according to an aspect of the disclosure includes: a case formed with a housing space inside; a light projecting part disposed in the housing space and emitting light; a light receiving part disposed in the housing space and receiving light; and a light guide member disposed in the housing space and having one side portion disposed opposite to the light projecting part and the light receiving part, and the other side portion directed to outside of the case. The light guide member includes: a light projecting side light guide part extending in a predetermined direction and guiding light emitted from the light projecting part to the outside of the case; a light receiving side light guide part extending in the predetermined direction and spaced apart from the light projecting side light guide part by a gap in a direction intersecting the predetermined direction, and the light receiving side light guide part guiding light that enters from the outside of the case to the light receiving part; and a connecting part disposed over the gap and connecting the light projecting side light guide part and the light receiving side light guide part. The gap is provided with a reduction part at an end portion on the side of the connecting part, and a dimension of the reduction part gradually decreases toward the side of the light projecting part.

DESCRIPTION OF THE EMBODIMENTS

Figure 1:
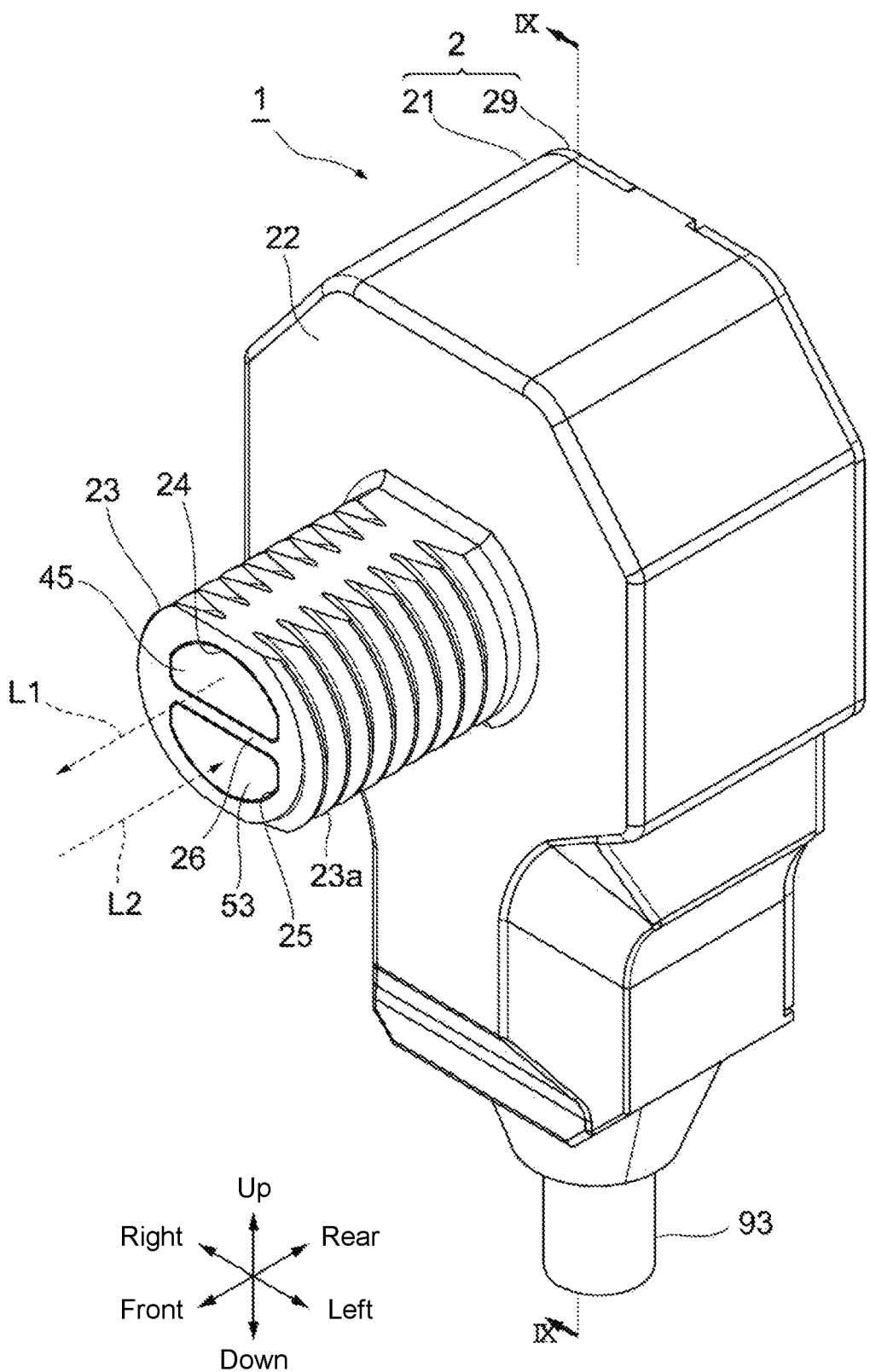
FIG. 1 is a perspective view showing the photoelectric sensor according to an embodiment.

The disclosure provides a photoelectric sensor that can reliably guide light by a light guide member even with a simple configuration.

A photoelectric sensor according to an aspect of the disclosure includes: a case formed with a housing space inside; a light projecting part disposed in the housing space and emitting light; a light receiving part disposed in the housing space and receiving light; and a light guide member disposed in the housing space and having one side portion disposed opposite to the light projecting part and the light receiving part, and the other side portion directed to outside of the case. The light guide member includes: a light projecting side light guide part extending in a predetermined direction and guiding light emitted from the light projecting part to the outside of the case; a light receiving side light guide part extending in the predetermined direction and spaced apart from the light projecting side light guide part by a gap in a direction intersecting the predetermined direction, and the light receiving side light guide part guiding light that enters from the outside of the case to the light receiving part; and a connecting part disposed over the gap and connecting the light projecting side light guide part and the light receiving side light guide part. The gap is provided with a reduction part at an end portion on the side of the connecting part, and a dimension of the reduction part gradually decreases toward the side of the light projecting part.

According to this aspect, the light projecting side light guide part and the light receiving side light guide part are connected by the connecting part that is disposed over the gap between the light projecting side light guide part and the light receiving side light guide part. Therefore, it is possible to guide light for the light projecting part and guide light for the light receiving part in the predetermined direction with one light guide member.

Further, the gap is provided with the reduction part at the end portion on the side of the connecting part, and the dimension of the reduction part gradually decreases toward the side of the light projecting part. Thus, it is possible to reduce the portion, which may reflect light to the side of the light receiving part, on the boundary surface formed by the surface of the light guide member which forms the gap. As a result, it is possible to prevent the light that is emitted from the light projecting part and enters the inside of the light guide member from being reflected unexpectedly with the surface of the light guide member, which forms the gap, as the boundary surface, and prevent it from reaching the light receiving part. Consequently, it is possible to reliably guide light by the light guide member and prevent erroneously detecting that there is an object when no object is present.

In the above aspect, the reduction part may be formed by two plane surfaces that are connected to each other.

According to this aspect, compared with the case of using a curved surface, the reduction part can be formed easily, and it is possible to further reduce the portion, which may reflect light to the side of the light receiving part, on the boundary surface formed by the surface of the light guide member which forms the gap.

In the above aspect, the two plane surfaces may be connected to each other to form an acute angle.

According to this aspect, it is possible to further reduce the portion, which may reflect light to the side of the light receiving part, on the boundary surface formed by the surface of the light guide member which forms the gap. As a result, it is possible to more reliably prevent the light that is emitted from the light projecting part and enters the inside of the light guide member from being reflected unexpectedly with the surface of the light guide member, which forms the gap, as the boundary surface, and prevent it from reaching the light receiving part.

According to the disclosure, it is possible to provide a photoelectric sensor that can reliably guide light by a light guide member even with a simple configuration.

An embodiment of the disclosure will be described below with reference to the accompanying drawings. In the respective drawings, parts denoted by the same reference numerals have the same or similar configurations.

In this specification, as shown in FIG. 1, the direction indicated by the arrow L1 (to be described later) is referred to as "front" and the direction indicated by the arrow L2 is referred to as "rear". In addition, when facing toward the front side, the left side is referred to as "left" and the right side is referred to as "right". Further, the upper side is referred to as "up" and the lower side is referred to as "down". Nevertheless, the designation of these directions does not limit the form of use of the disclosure.

First, the outline of a photoelectric sensor 1 according to the embodiment will be described with reference to FIG. 1. FIG. 1 is a perspective view showing the photoelectric sensor 1.

The photoelectric sensor 1 includes a case 2 and a cable 93. The case 2 includes a first case member 21 and a second case member 29. On the first case member 21, a protrusion 23 is formed to protrude toward the front side from a main body part 22 of the first case member 21. The protrusion 23 has a substantially cylindrical shape, and the inside of the protrusion 23 is divided into a light projecting side light guide path 24 and a light receiving side light guide path 25 by a partition wall 26. An exit surface 45 of a light guide member 3 (to be described later) is disposed in the light projecting side light guide path 24 and an entrance surface 53 is disposed in the light receiving side light guide path 25.

A screw part 23a is formed on the outer peripheral surface of the protrusion 23. The screw part 23a is a male screw and has a helical shape with the front-and-rear direction as the axial direction. For example, the protrusion 23 is inserted into a through hole (not shown) formed in a jig and a nut (not shown) is screwed to the screw part 23a of the protrusion 23, so as to fix the photoelectric sensor 1 to the jig. The photoelectric sensor 1 is arranged with the exit surface 45 and the entrance surface 53 facing toward the front side of the photoelectric sensor 1 where a detection region (not shown) exists.

The photoelectric sensor 1 receives power supply via the cable 93 and emits light from the exit surface 45. The light can be visible light, for example, but the wavelength, etc. of the light is not limited if the light is reflected by the surface of the object. The light emitted from the exit surface 45 travels toward the front side as indicated by the arrow L1.

On the other hand, light enters the entrance surface 53 from the front side as indicated by the arrow L2. The photoelectric sensor 1 generates an electric signal corresponding to the amount of light that enters the entrance surface 53 and performs a predetermined calculation based on the electric signal.

When no object is present in the detection region, the amount of light that enters the entrance surface 53 is very small. On the other hand, when an object is present in the detection region, the light emitted from the exit surface 45 is reflected by the surface of the object and directed to the photoelectric sensor 1, so the amount of light that enters the entrance surface 53 increases.

Thus, the amount of light that enters the entrance surface 53 differs depending on whether an object is present in the detection region. The photoelectric sensor 1 detects whether an object is present, the surface condition of the object, etc. based on the difference in light amount. For example, the photoelectric sensor 1 detects whether an object is present in the detection region based on comparison between the amount of light that enters the entrance surface 53 and a predetermined threshold value.

Figure 2:
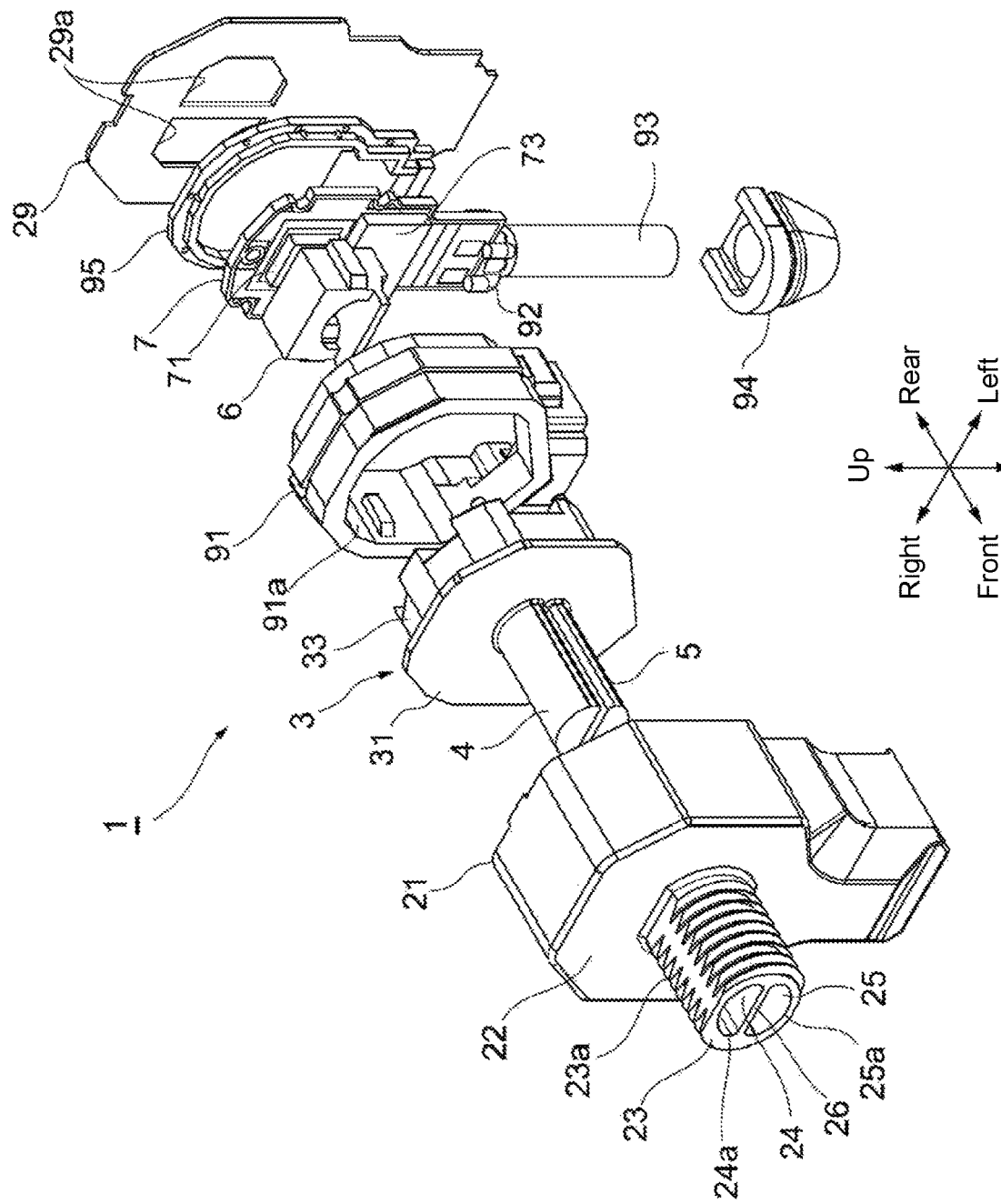
FIG. 2 is an exploded perspective view of the photoelectric sensor of FIG. 1.
Figure 3:
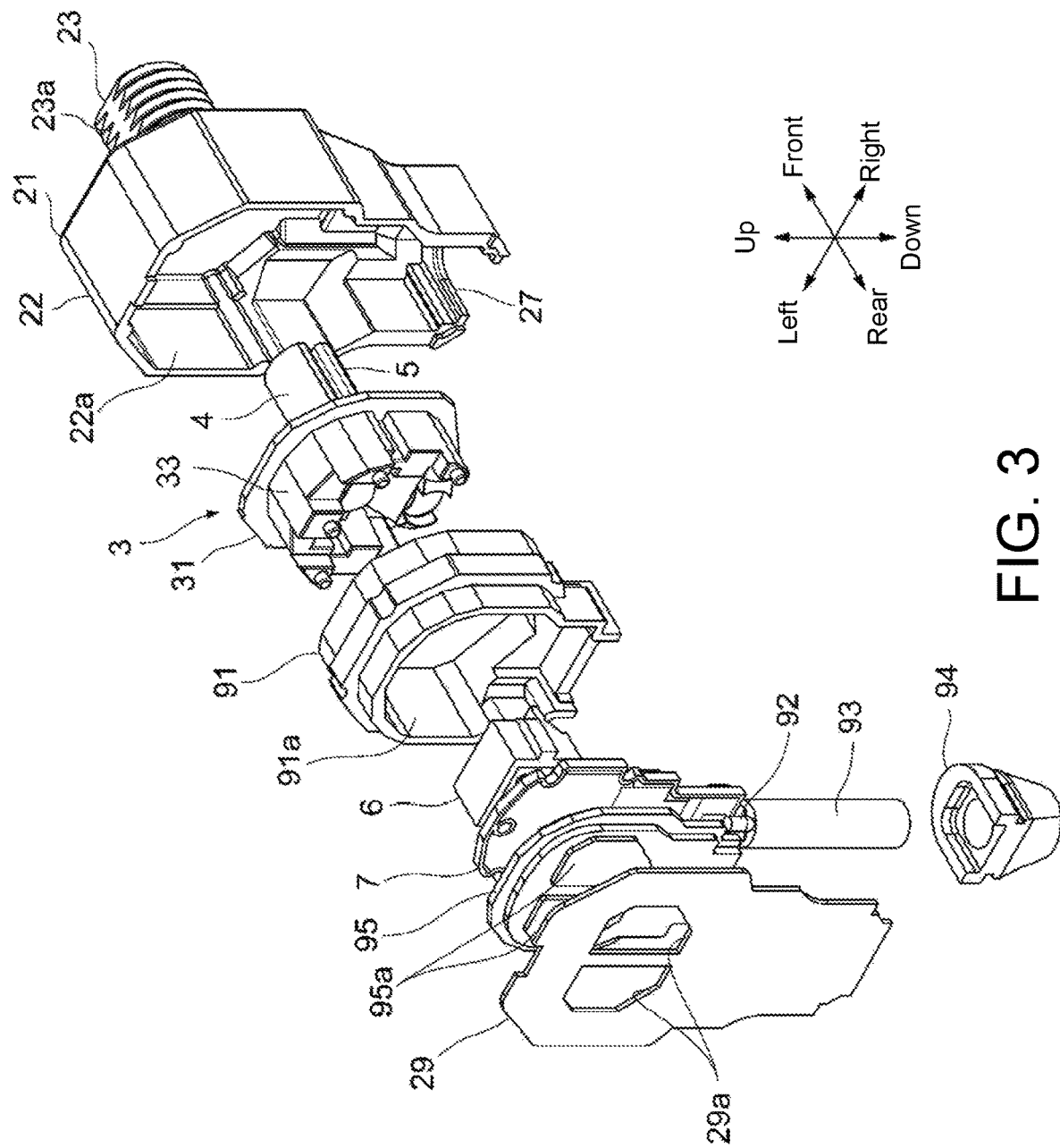
FIG. 3 is an exploded perspective view of the photoelectric sensor of FIG. 1.
Figure 4:
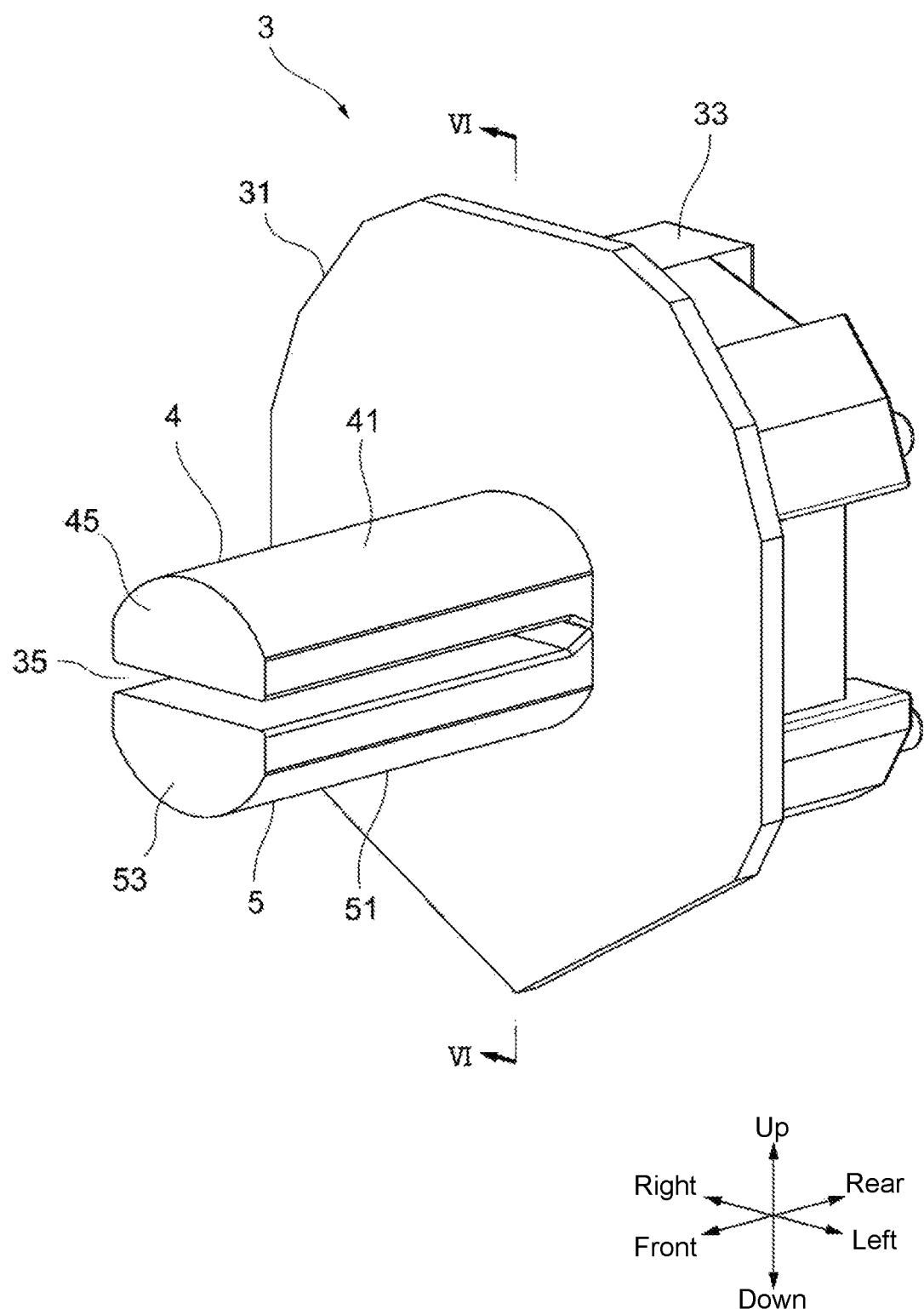
FIG. 4 is a perspective view showing the light guide member of FIG. 2.
Figure 5:
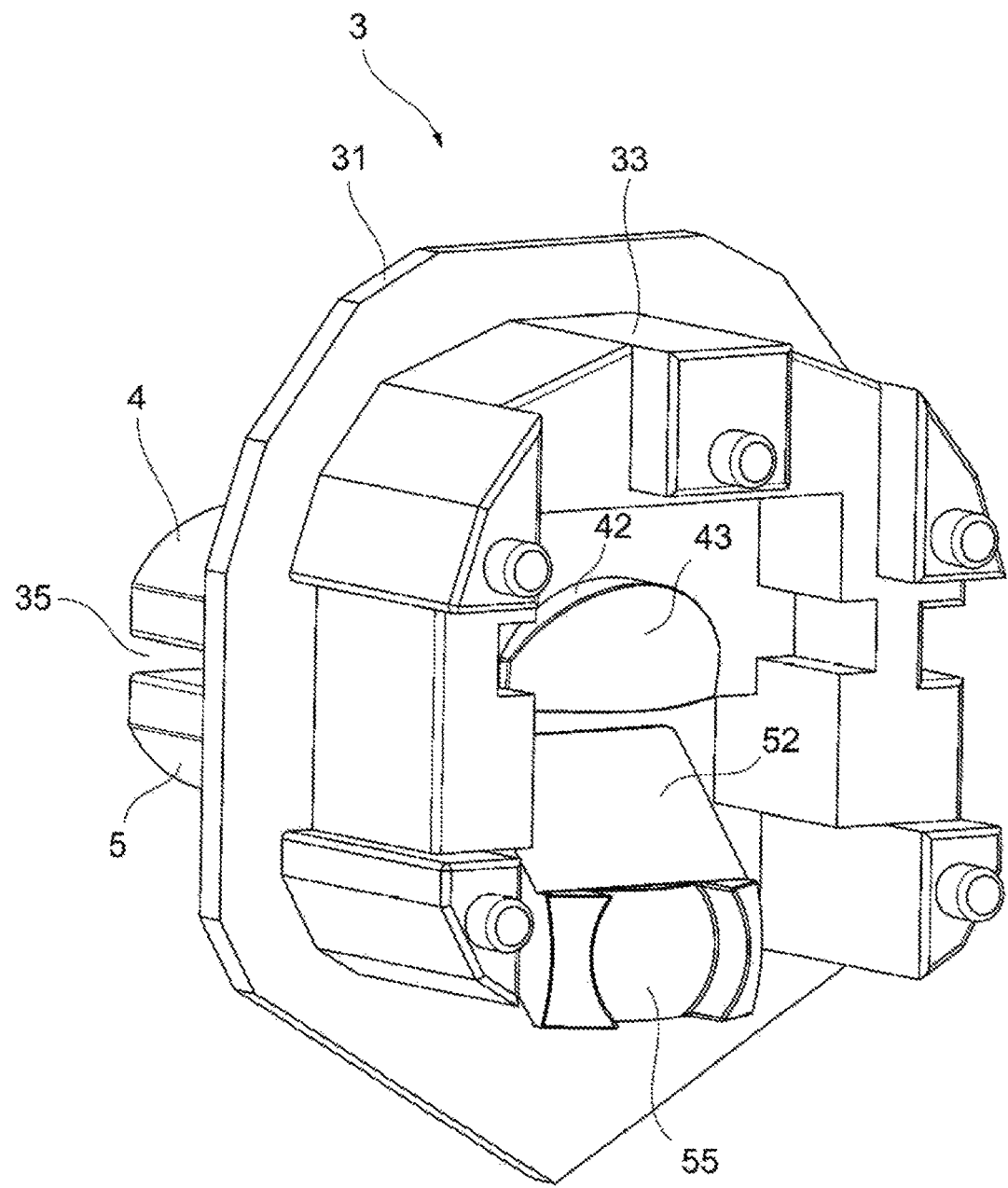
FIG. 5 is a perspective view showing the light guide member of FIG. 2.
Figure 5:
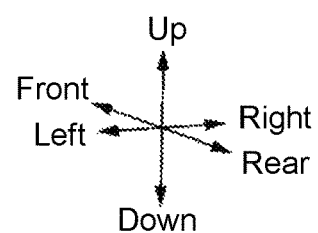
Figure 6:
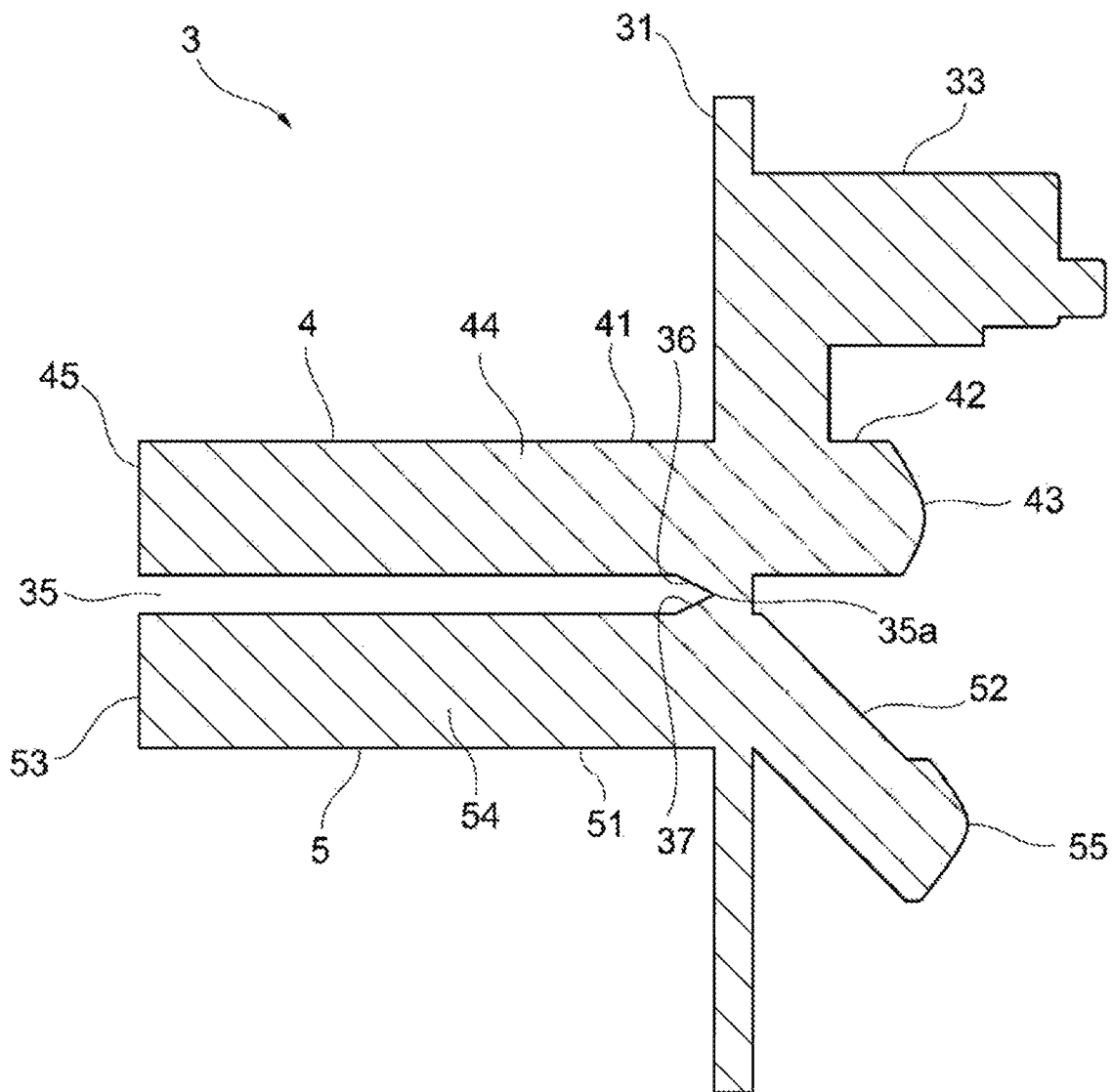
FIG. 6 is a cross-sectional view showing the VI-VI cross section of FIG. 4.
Figure 6:
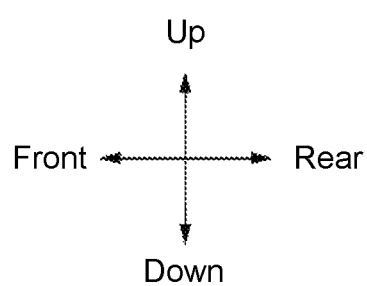
Figure 7:
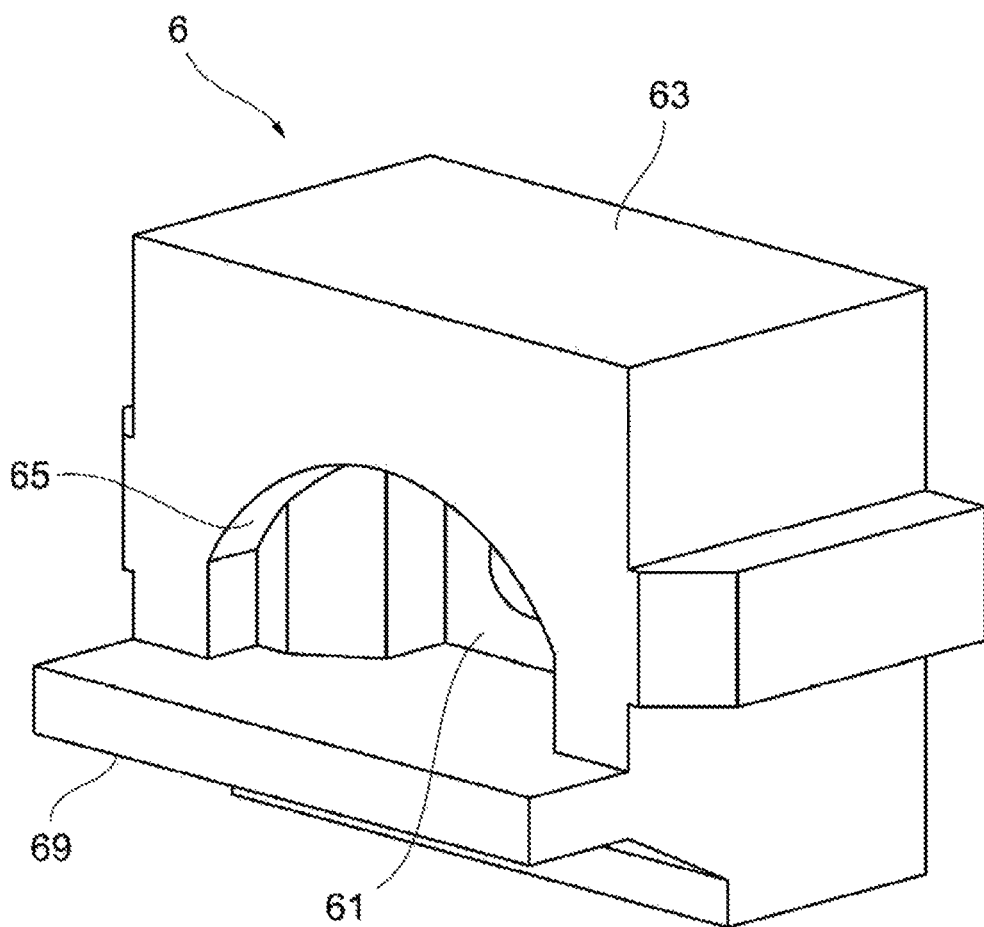
FIG. 7 is a perspective view showing the light shielding member of FIG. 2.
Figure 7:
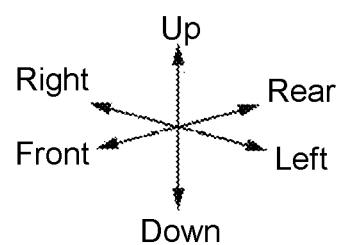
Figure 8:
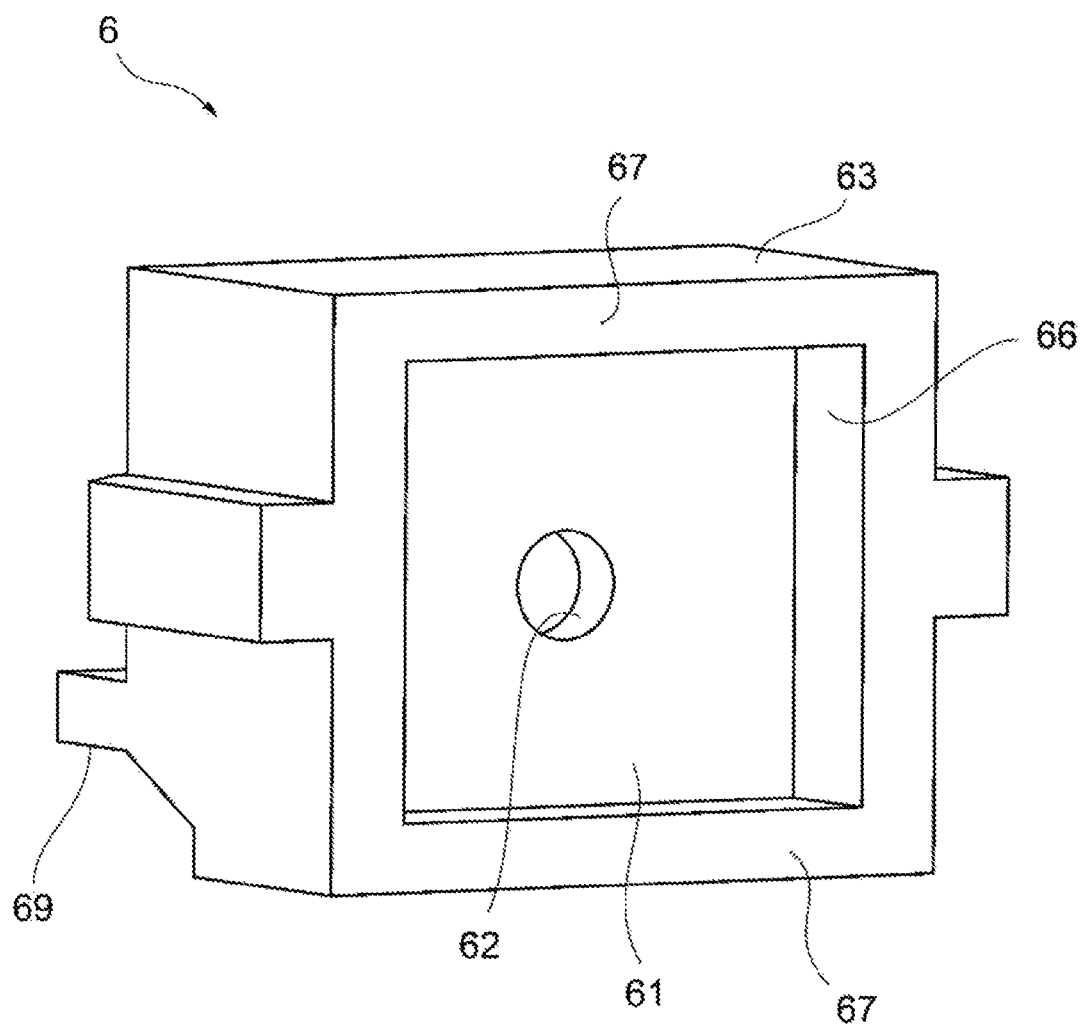
FIG. 8 is a perspective view showing the light shielding member of FIG. 2.
Figure 8:
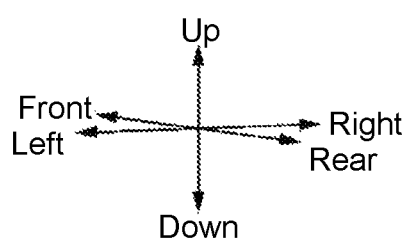

Next, parts housed in the case 2 will be described with reference to FIG. 2 to FIG. 8. FIG. 2 and FIG. 3 are exploded perspective views showing the photoelectric sensor 1. FIG. 4 and FIG. 5 are perspective views showing the light guide member 3. FIG. 6 is a cross-sectional view showing the VI-VI cross section of FIG. 4. FIG. 7 and FIG. 8 are perspective views showing a light shielding member 6.

As described above, the case 2 includes the first case member 21 and the second case member 29. As shown in FIG. 3, a recess 22a is formed in the rear portion of the main body part 22 of the first case member 21. Further, a notch 27 communicating with the recess 22a is formed at the lower end of the main body part 22. The second case member 29 has a substantially flat plate shape and is formed with two holes 29a that penetrate in the thickness direction. The second case member 29 is disposed on the rear side of the first case member 21 and faces the first case member 21 in the front-and-rear direction. The second case member 29 covers the recess 22a of the first case member 21, so as to form a housing space between the first case member 21 and the second case member 29.

As shown in FIG. 2 and FIG. 3, the light guide member 3, the light shielding member 6, and a base board 7 are disposed in the housing space of the case 2.

The light guide member 3 is made of a light-transmitting material such as acrylic or glass. The light guide member 3 includes a light projecting side light guide part 4, a light receiving side light guide part 5, and a connecting part 31.

As shown in FIG. 6, the light projecting side light guide part 4 has a protrusion 41 that protrudes toward the front side from the connecting part 31, and a protrusion 42 that protrudes toward the rear side. The connecting part 31 has a substantially flat plate shape with the front-and-rear direction as the thickness direction. The protrusion 41 has the exit surface 45 which is a flat surface at the front end. Moreover, the protrusion 42 has an entrance surface 43 which is a curved surface at the rear end. The entrance surface 43 is a convex lens and focuses the light emitted from a light projecting part 71 (to be described later) on the light projecting side light guide part 4. Both the protrusion 41 and the protrusion 42 protrude along the front-and-rear direction. Therefore, the light projecting side light guide part 4 extends linearly between the entrance surface 43 and the exit surface 45.

The light receiving side light guide part 5 has a protrusion 51 that protrudes toward the front side from the connecting part 31, and a protrusion 52 that protrudes toward the rear side. The protrusion 51 has the entrance surface 53 which is a flat surface at the front end. Moreover, the protrusion 52 has an exit surface 55 which is a curved surface at the rear end. The exit surface 55 is a convex lens and focuses the light guided by the light receiving side light guide part 5 on a light receiving part 73 (to be described later).

While the protrusion 51 protrudes along the front-and-rear direction, the protrusion 52 protrudes in a direction inclined with respect to the front-and-rear direction. To be more specific, the protrusion 52 protrudes downward away from the protrusion 41 at an angle of approximately 45° with respect to the front-and-rear direction. Therefore, the light receiving side light guide part 5 extends from the entrance surface 53 to the exit surface 55 to bend at the connecting part 31.

The light projecting side light guide part 4 and the light receiving side light guide part 5 are spaced apart from each other in the up-and-down direction and connected by the connecting part 31. In other words, the light receiving side light guide part 5 is disposed below the light projecting side light guide part 4 with a gap 35 formed between the light receiving side light guide part 5 and the light projecting side light guide part 4.

As shown in FIG. 6, a reduction part 35a is provided at the end portion of the gap 35 on the side of the connecting part 31. The reduction part 35a is formed by a plane surface 36 and a plane surface 37. The plane surface 36 and the plane surface 37 are connected to each other to form an acute angle. Therefore, the gap 35 extends with a constant dimension from the front end to the reduction part 35a, and the dimension gradually decreases toward the rear side in the reduction part 35a.

The rear surface of the connecting part 31 is provided with a surrounding wall 33. As shown in FIG. 5, the surrounding wall 33 protrudes toward the rear side from the rear surface of the connecting part 31 and surrounds the upper side, the left side, and the right side of the protrusion 42 of the light projecting side light guide part 4 and the protrusion 52 of the light receiving side light guide part 5.

The light shielding member 6 is made of a non-light-transmitting material. As shown in FIG. 7 and FIG. 8, the light shielding member 6 includes a shielding wall 61, a peripheral wall 63, and a barrier wall 69. The shielding wall 61 has a substantially flat plate shape with the front-and-rear direction as the thickness direction. A through hole 62 is formed at the substantially central portion of the shielding wall 61. The through hole 62 has a substantially circular cross section and penetrates the shielding wall 61 in the front-and-rear direction. The peripheral wall 63 is disposed on the peripheral portion of the shielding wall 61 and extends in the front-and-rear direction. A fitting part 65 is formed on the front side of the shielding wall 61, and a recess 66 is formed on the rear side of the shielding wall 61. The peripheral wall 63 has a contact part 67 which is a flat surface at the rear end.

As shown in FIG. 2 and FIG. 3, the base board 7 has a substantially flat plate shape. As shown in FIG. 2, a light projecting part 71 and a light receiving part 73 are mounted on the front surface of the base board 7. The light projecting part 71 includes a light emitting element (not shown) such as a light emitting diode, and the light receiving part 73 includes a light receiving element (not shown) such as a photodiode. The light receiving part 73 is disposed below the light projecting part 71 and separated from the light projecting part 71. The cable 93 is connected to the lower end of the base board 7 via a connector 92. The cable 93 is flexible and is inserted through a cable holder 94. The cable holder 94 is formed of an elastic resin material or the like and can be deformed to follow the cable 93.

In addition, a holder 91 and a plate 95 are disposed in the housing space of the case 2. The holder 91 and the plate 95 are members used for fixing the light guide member 3, the light shielding member 6, and the base board 7 in the housing space. The holder 91 is formed with a hole 91a and has a substantially annular shape as a whole. The plate 95 has a substantially flat plate shape and is formed with two protrusions 95a on the rear surface, as shown in FIG. 3.

Figure 9:
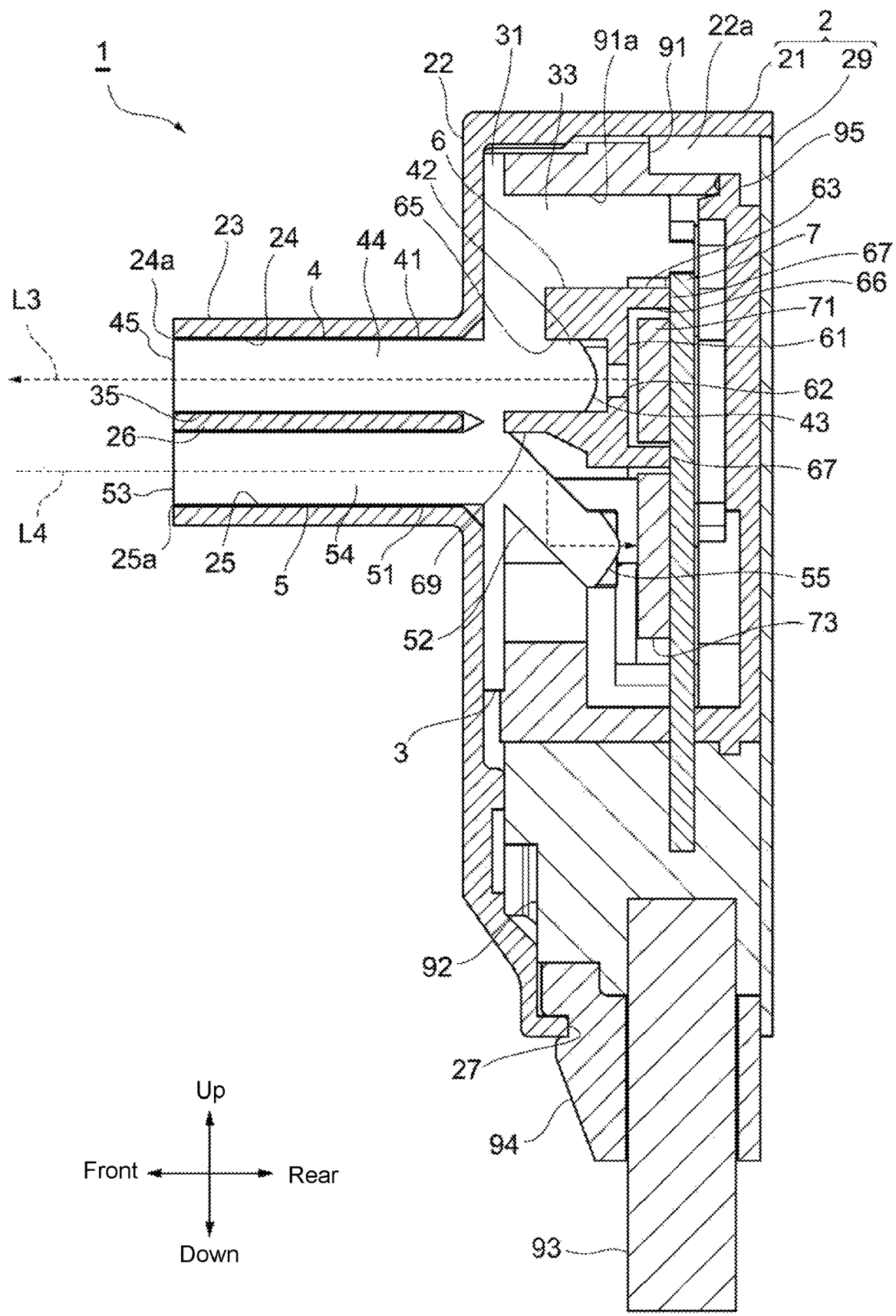
FIG. 9 is a cross-sectional view showing the IX-IX cross section of FIG. 1.

Next, the arrangement of each part in the housing space of the case 2 will be described with reference to FIG. 9. FIG. 9 is a cross-sectional view showing the IX-IX cross section of FIG. 1. In FIG. 9, hatching of the cross section of the light guide member 3 is omitted.

When the photoelectric sensor 1 is assembled, a part of the light guide member 3 is inserted into the protrusion 23 of the first case member 21. To be more specific, the protrusion 41 of the light projecting side light guide part 4 is inserted into the light projecting side light guide path 24 and the protrusion 51 of the light receiving side light guide part 5 is inserted into the light receiving side light guide path 25. Both the protrusion 41 and the protrusion 51 are inserted along the front-and-rear direction from the rear side of the first case member 21. At this time, the partition wall 26 of the first case member 21 is inserted into the gap 35 of the light guide member 3.

When the insertion of the light projecting side light guide part 4 into the light projecting side light guide path 24 and the insertion of the light receiving side light guide part 5 into the light receiving side light guide path 25 are completed, the exit surface 45 is disposed at the front end 24a of the light projecting side light guide path 24 and the entrance surface 53 is disposed at the front end 25a of the light receiving side light guide path 25. Thus, at the front end of the protrusion 23 of the first case member 21, the exit surface 45 and the entrance surface 53 are arranged adjacent to each other in the up-and-down direction with the partition wall 26 interposed therebetween.

The holder 91 is attached to the light guide member 3 from the rear side. The holder 91 is attached such that the surrounding wall 33 of the light guide member 3 is inserted into the hole 91a and the holder 91 is in contact with the rear surface of the connecting part 31 in the front-and-rear direction.

The light shielding member 6 is attached to the light guide member 3 from the rear side. The light shielding member 6 is attached so that the protrusion 42 of the light projecting side light guide part 4 of the light guide member 3 is fitted into the fitting part 65 of the light shielding member 6 from the front side. When the attachment of the light shielding member 6 to the light guide member 3 is completed, the barrier wall 69 of the light shielding member 6 is disposed between the protrusion 42 of the light projecting side light guide part 4 and the protrusion 52 of the light receiving side light guide part 5. In other words, the barrier wall 69 separates the light projecting side light guide part 4 and the light receiving side light guide part 5 in the up-and-down direction.

The base board 7 is attached to the light guide member 3 from the rear side. To be more specific, the base board 7 is disposed inside the surrounding wall 33 of the light guide member 3. In addition, the base board 7 is disposed to be in contact with the contact part 67 of the light shielding member 6 and the holder 91 in the front-and-rear direction on the front surface. By bringing the contact part 67 of the light shielding member 6 into contact with the front surface of the base board 7, the positional relationship between the base board 7 and the light guide member 3 in the front-and-rear direction is defined.

When the base board 7 is attached to the light guide member 3, the connector 92 is disposed in the recess 22a of the first case member 21 and the cable holder 94 is engaged with the notch 27 of the first case member 21. In addition, the light projecting part 71 is disposed in the recess 66 of the light shielding member 6. The periphery of the light projecting part 71 is surrounded by the peripheral wall 63 and the front thereof is shielded by the shielding wall 61. Thus, the light projecting part 71 faces the entrance surface 43 of the light guide member 3 in the front-and-rear direction with the shielding wall 61 interposed therebetween. Furthermore, the light receiving part 73 faces the exit surface 55 of the light guide member 3 in the front-and-rear direction.

The plate 95 is attached to the holder 91 and the base board 7 from the rear side. The plate 95 is disposed to be in contact with the rear end of the holder 91 and the rear surface of the base board 7 on the front surface.

The second case member 29 is attached to the first case member 21 from the rear side. The second case member 29 is disposed to be in contact with the rear end portion of the first case member 21 and to cover the plate 95. The protrusions 95a (see FIG. 3) of the plate 95 are fitted into the holes 29a (see FIG. 2 and FIG. 3) of the second case member 29.

The photoelectric sensor 1 configured as described above receives power supply via the cable 93. The light emitting element of the light projecting part 71 receives the power supply and emits light toward the front side. A part of the light passes through the through hole 62 of the light shielding member 6 and then enters the entrance surface 43 of the light guide member 3, as indicated by the arrow L3. The arrow L3 illustrates one of the traveling directions of the light emitted from the light projecting part 71.

The light that enters the entrance surface 43 reaches the inside 44 of the light projecting side light guide part 4. The light projecting side light guide part 4 guides a part of the light directly to the exit surface 45, as indicated by the arrow L3. In addition, the light projecting side light guide part 4 guides another part of the light to the exit surface 45 while reflecting it at the boundary surface. The exit surface 45 emits the light that comes from the rear side toward the detection region on the front side.

On the other hand, the light that comes from the detection region enters the entrance surface 53 of the light guide member 3, as indicated by the arrow L4. The arrow L4 illustrates one of the traveling directions of the light that enters the entrance surface 53.

The light that enters the entrance surface 53 reaches the inside 54 of the light receiving side light guide part 5. The light receiving side light guide part 5 guides a part of the light directly to the protrusion 52, as indicated by the arrow L4. In addition, the light receiving side light guide part 5 guides another part of the light to the protrusion 52 while reflecting it at the boundary surface.

As described above, the protrusion 52 protrudes downward away from the protrusion 41 at an angle of approximately 45° with respect to the front-and-rear direction. Therefore, the light that reaches the protrusion 52 is guided downward and rearward while being reflected at the boundary surface of the protrusion 52, and reaches the exit surface 55, as indicated by the arrow L4. The light is emitted from the exit surface 55 and reaches the light receiving part 73. The photoelectric sensor 1 detects whether an object is present in the detection region, the surface condition of the object, etc. based on the amount of light received by the light receiving part 73, as described above.

Figure 10:
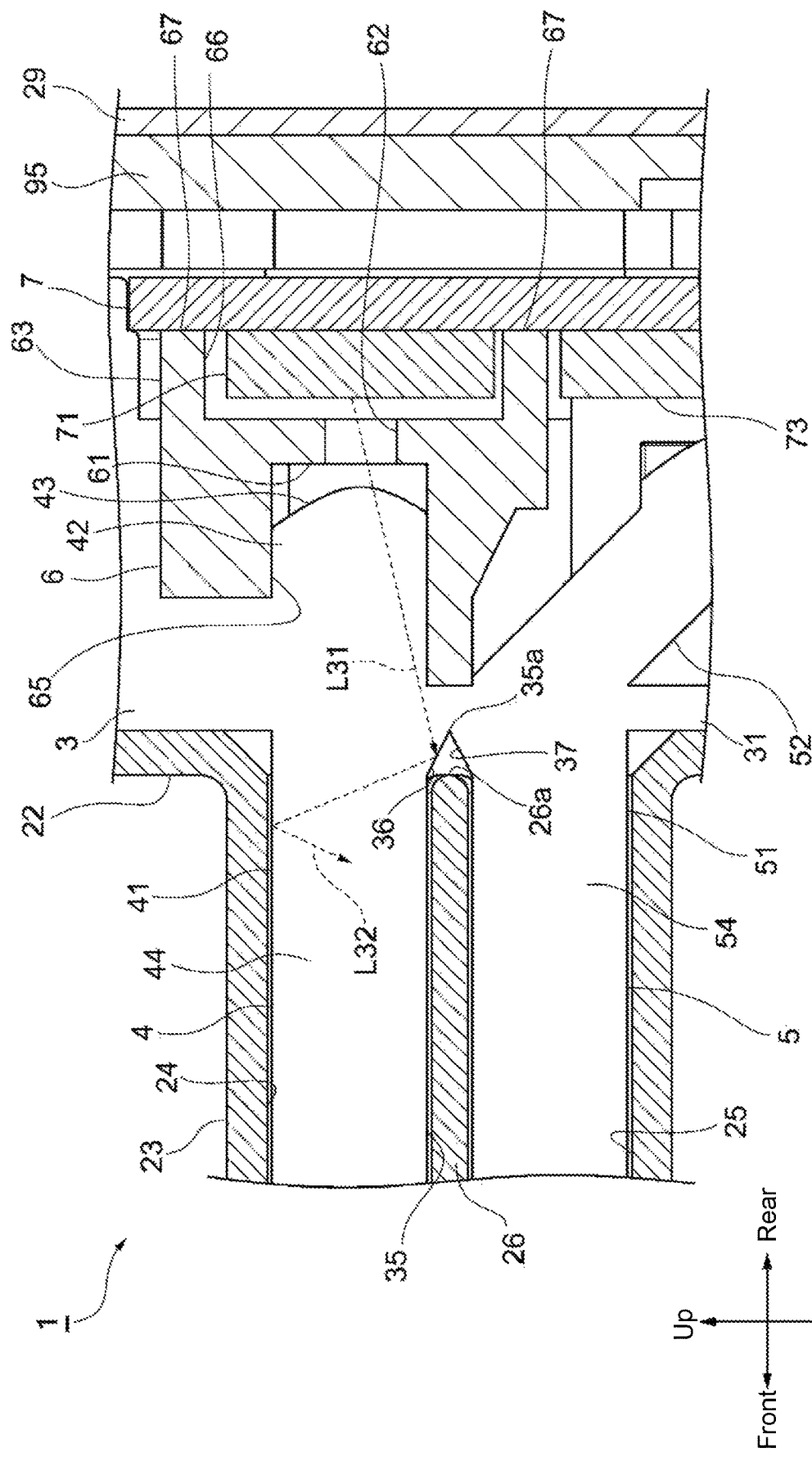
FIG. 10 is a cross-sectional view showing the IX-IX cross section of FIG. 1.
Figure 11:
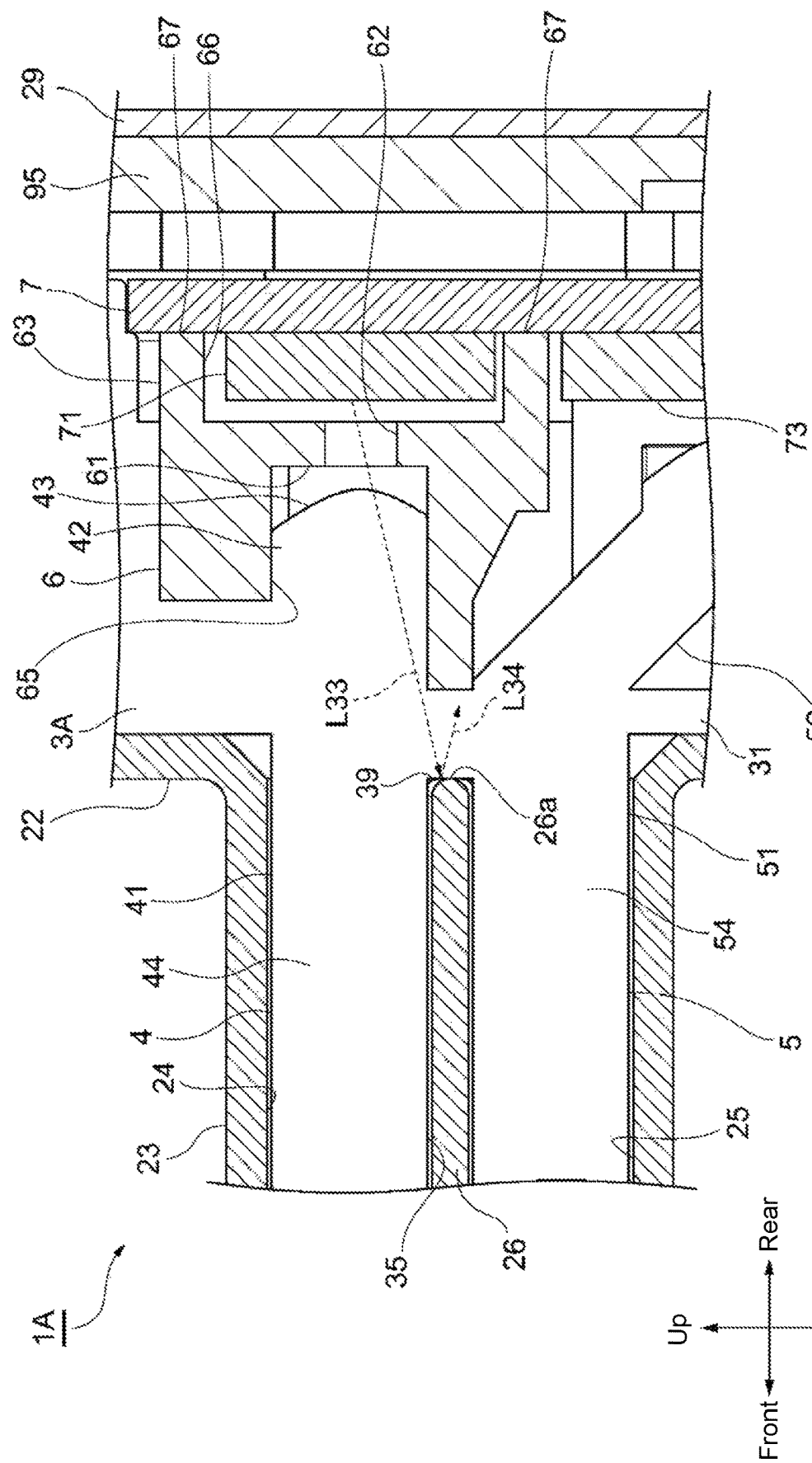
FIG. 11 is a cross-sectional view showing the photoelectric sensor according to a comparative example.

Next, the traveling of light near the reduction part 35a of the light guide member 3 will be described with reference to FIG. 10 and FIG. 11. FIG. 10 is a cross-sectional view showing the IX-IX cross section of FIG. 1 and enlarges the area near the reduction part 35a. FIG. 11 is a cross-sectional view showing a photoelectric sensor 1A according to a comparative example and shows a cross section corresponding to the IX-IX cross section of FIG. 1.

The photoelectric sensor 1A according to the comparative example shown in FIG. 11 has a light guide member 3A that is different from the light guide member 3 of the photoelectric sensor 1 according to the embodiment. To be more specific, the gap 35 of the light guide member 3A does not have the reduction part 35a (see FIG. 10) at the end portion on the side of the connecting part 31. In the configuration of the photoelectric sensor 1A, parts the same as those in the configuration of the photoelectric sensor 1 are denoted by the same reference numerals, and descriptions thereof are omitted.

As described above, the reduction part 35a of the light guide member 3 of the photoelectric sensor 1 according to the embodiment is formed by the plane surface 36 and the plane surface 37. As shown in FIG. 10, the plane surface 36 and the plane surface 37 are connected to each other to form an acute angle, and the connection portion thereof is directed rearward. In addition, the plane surface 36 and the plane surface 37 are disposed below the entrance surface 43 of the light guide member 3, and both of them are inclined with respect to the front-and-rear direction. To be more specific, the plane surface 36 is inclined so that the normal direction thereof is forward and downward, and the plane surface 37 is inclined so that the normal direction thereof is forward and upward.

Furthermore, as described above, the partition wall 26 of the first case member 21 is inserted into the gap 35 of the light guide member 3. The end portion 26a of the partition wall 26 is spaced from the reduction part 35a. In other words, the end portion 26a of the partition wall 26 is not in contact with the plane surface 36 and the plane surface 37 of the reduction part 35a.

In the photoelectric sensor 1 according to the embodiment, a part of the light that is emitted from the light projecting part 71 and enters the entrance surface 43 of the light guide member 3 travels forward and downward and reaches the plane surface 36 of the reduction part 35a, as indicated by the arrow L31. The light is reflected with the plane surface 36 as the boundary surface and is guided to the protrusion 41 of the light projecting side light guide part 4, as indicated by the arrow L32. Thus, the plane surface 36 of the reduction part 35a prevents the light emitted from the light projecting part 71 from reaching the light receiving part 73, and the reflected light is prevented from reaching the light receiving part 73 to cause erroneous detection. Therefore, it is possible to prevent erroneously detecting that there is an object when no object is present.

On the other hand, as shown in FIG. 11, the gap 35 of the light guide member 3A according to the comparative example does not have the reduction part 35a (see FIG. 10) but has a plane surface 39. The plane surface 39 is a surface with the forward direction as the normal direction.

In the photoelectric sensor 1A according to the comparative example, a part of the light that is emitted from the light projecting part 71 and enters the entrance surface 43 of the light guide member 3 travels forward and downward and reaches the plane surface 39, as indicated by the arrow L33. The light may be reflected backward with the plane surface 39 as the boundary surface, as indicated by the arrow L34, and a part or the front part thereof may reach the light receiving part 73. Therefore, for the light guide member 3A according to the comparative example, the light emitted from the light projecting part 71 may reach the light receiving part 73, which raises concern of erroneously detecting that there is an object when no object is present.

As described above, the photoelectric sensor 1 according to the embodiment includes: the case 2 formed with the housing space inside; the light projecting part 71 disposed in the housing space and emitting light; the light receiving part 73 disposed in the housing space and receiving light; and the light guide member 3 disposed in the housing space and having one side portion disposed opposite to the light projecting part 71 and the light receiving part 73, and the other side portion directed to the outside of the case 2. The light guide member 3 includes: the light projecting side light guide part 4 extending in the front-and-rear direction and guiding the light emitted from the light projecting part 71 to the outside of the case 2; the light receiving side light guide part 5 extending in the front-and-rear direction and spaced apart from the light projecting side light guide part 4 by the gap 35 in the up-and-down direction, and guiding light that enters from the outside of the case 2 to the light receiving part 73; and the connecting part 31 disposed over the gap 35 and connecting the light projecting side light guide part 4 and the light receiving side light guide part 5. The gap 35 is provided with the reduction part 35a at the end portion on the side of the connecting part 31, and a dimension of the reduction part 35a gradually decreases toward the side of the light projecting part 71.

According to this aspect, the light projecting side light guide part 4 and the light receiving side light guide part 5 are connected by the connecting part 31 disposed over the gap 35 between the light projecting side light guide part 4 and the light receiving side light guide part 5. Therefore, it is possible to guide light for the light projecting part 71 and guide light for the light receiving part 73 in the front-and-rear direction with one light guide member 3.

Further, the gap 35 is provided with the reduction part 35a at the end portion on the side of the connecting part 31, and the dimension of the reduction part 35a gradually decreases toward the side of the light projecting part 71. Thus, it is possible to reduce the portion, which may reflect light to the side of the light projecting part 71, on the boundary surface formed by the surface of the light guide member 3 which forms the gap 35. As a result, it is possible to prevent the light that is emitted from the light projecting part 71 and enters the inside of the light guide member 3 from being reflected unexpectedly with the surface of the light guide member 3, which forms the gap 35, as the boundary surface, and prevent it from reaching the light receiving part 73. Consequently, it is possible to reliably guide light by the light guide member and prevent erroneously detecting that there is an object when no object is present.

In addition, the reduction part 35a is formed by the two plane surfaces 36 and 37 that are connected to each other. According to this aspect, compared with the case of using a curved surface, the reduction part 35a can be formed easily, and it is possible to further reduce the portion, which may reflect light to the side of the light receiving part 73, on the boundary surface formed by the surface of the light guide member 3 which forms the gap 35.

Further, the two plane surfaces 36 and 37 are connected to each other to form an acute angle. According to this aspect, it is possible to further reduce the portion, which may reflect light to the side of the light receiving part 73, on the boundary surface formed by the surface of the light guide member 3 which forms the gap 35. As a result, it is possible to more reliably prevent the light that is emitted from the light projecting part 71 and enters the inside of the light guide member 3 from being reflected unexpectedly with the surface of the light guide member 3, which forms the gap 35, as the boundary surface, and prevent it from reaching the light receiving part 73.

Moreover, in the above aspect, the case has the partition wall that is inserted into the gap, and the end portion of the partition wall is spaced from the reduction part. If the end portion 26a of the partition wall 26 is in contact with the reduction part 35a, the total reflection condition of the light guide member 3 in the reduction part 35a may change, and the light that is emitted from the light projecting part 71 and enters the inside of the light guide member 3 may be reflected unexpectedly with the surface of the light guide member 3, which forms the gap, as the boundary surface, and may reach the light receiving part 73.

According to the embodiment in which the end portion 26a of the partition wall 26 is spaced from the reduction part 35a, the light guide member 3 has a surface in contact with air in the reduction part 35a. As a result, it is possible to more reliably prevent the light that is emitted from the light projecting part 71 and enters the inside of the light guide member 3 from being reflected unexpectedly with the surface of the light guide member 3, which forms the gap 35, as the boundary surface, and prevent it from reaching the light receiving part 73.

The embodiment of the disclosure has been described above with reference to specific examples. However, the disclosure is not limited to these specific examples. That is, appropriate design modifications that those skilled in the art make to these specific examples are also included in the scope of the disclosure as long as they have the features of the disclosure. The elements and their arrangements, materials, conditions, shapes, sizes, etc. of each specific example described above are not limited to those exemplified and can be modified appropriately.

What is claimed is:

1. A photoelectric sensor, comprising:
a case founded with a housing space inside;
a light projecting part disposed in the housing space and emitting light;
a light receiving part disposed in the housing space and receiving light; and
a light guide member disposed in the housing space and having one side portion disposed opposite to the light projecting part and the light receiving part, and the other side portion directed to outside of the case,
wherein the light guide member comprises:
a light projecting side light guide part extending in a predetermined direction and guiding light emitted from the light projecting part to the outside of the case;
a light receiving side light guide part extending in the predetermined direction and spaced apart from the light projecting side light guide part by a gap in a direction intersecting the predetermined direction, and the light receiving side light guide part having a protrusion that protrudes towards a front side of a connecting part in the predetermined direction and the light receiving side light guide part having another protrusion that protrudes towards a rear side of the connecting part in a direction inclined with respect to the predetermined direction for guiding light that enters from the outside of the case to the light receiving part; and
the connecting part disposed over the gap and connecting the light projecting side light guide part and the light receiving side light guide part,
wherein the gap is provided with a reduction part at an end portion on the side of the connecting part, and a dimension of the reduction part gradually decreases toward the side of the light projecting part.

2. The photoelectric sensor according to claim 1, wherein the reduction part is formed by two plane surfaces that are connected to each other.

3. The photoelectric sensor according to claim 2, wherein the two plane surfaces are connected to each other to form an acute angle.

* * * * *